W. C. BEAM.
PULLEY COVERING.
APPLICATION FILED FEB. 3, 1911.

1,024,667.

Patented Apr. 30, 1912.

Witnesses:
W. L. Dow
E. Behel.

Inventor:
Willie C. Beam
By A. O. Behel
Atty.

UNITED STATES PATENT OFFICE.

WILLIE C. BEAM, OF ROCKFORD, ILLINOIS.

PULLEY-COVERING.

1,024,667.  Specification of Letters Patent.  Patented Apr. 30, 1912.

Application filed February 3, 1911. Serial No. 606,354.

*To all whom it may concern:*

Be it known that I, WILLIE C. BEAM, a citizen of the United States, residing at Rockford, in the county of Winnebago and State of Illinois, have invented certain new and useful Improvements in Pulley-Coverings, of which the following is a specification.

The object of this invention is to cover a flat or crowned faced pulley with cord or rope in order to increase the holding contact therewith of a belt of friction.

Figure 2:
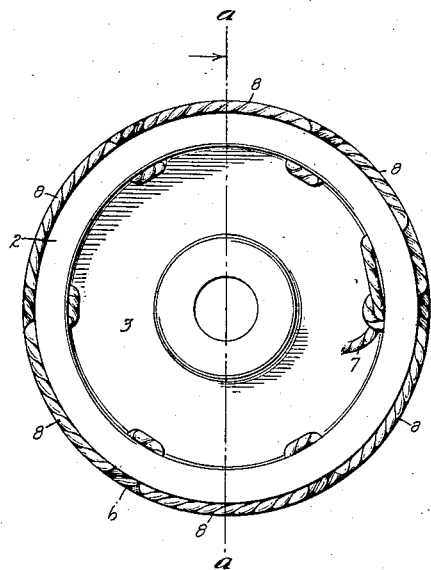
Figure 1:
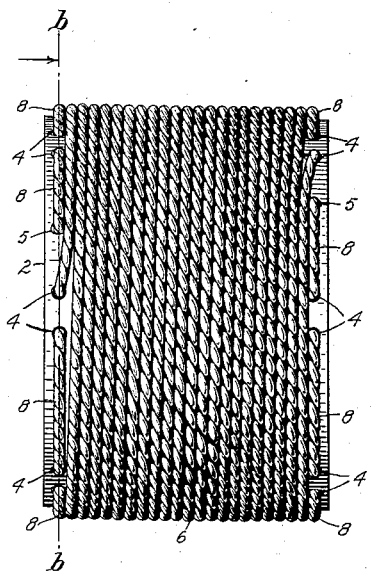
Figure 4:
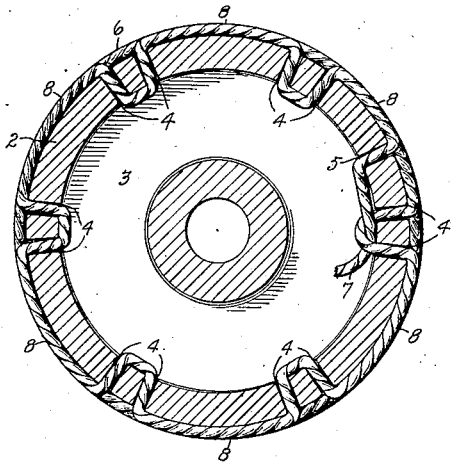
Figure 3:
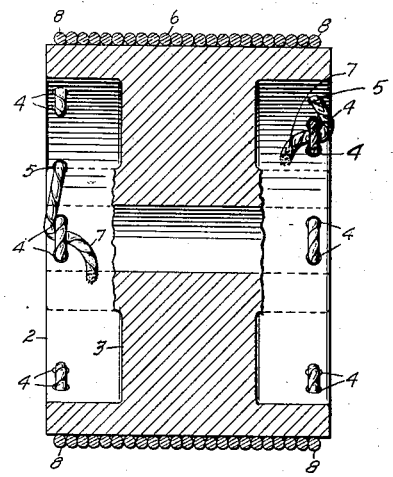

In the accompanying drawings Figure 1 is a face representation of a pulley with the covering in place. Fig. 2 is an end elevation. Fig. 3 is a vertical section on dotted line $a\ a$ Fig. 2. Fig. 4 is a section on dotted line $b\ b$ Fig. 1.

The pulley in this instance is of the ordinary iron construction in which the rim 2 is supported by the center flange or arms 3. The edges of the rim 2 are formed with holes 4 in pairs, the distance between the holes of a pair being closer than the distance between a pair of holes. Adjacent to one pair of holes is located an additional hole 5 for a purpose to appear hereinafter.

The covering is formed of cord or rope 6 placed closely on the rim 2 of the pulley. Both ends 7 of the covering is threaded through the holes 4 in each edge of the rim and finally passed through the additional hole 5 in that edge of the pulley and tucked under the adjacent loop on the inner face of the rim. The loops 8 on both edges of the rim serve to prevent the displacement of the main coils of the cord in a lateral direction. By thus arranging the loops 8 an ordinary pulley can be covered with the cord thereby insuring the friction when a belt is employed or increasing the friction when used as a friction pulley. While I have shown my improvements applied to an iron pulley it is evident that wood pulleys may be covered in the same manner.

In using the term "flat or crown faced pulley" I mean a pulley without an edging at the ends of the flange, pulleys with such edging are termed "grooved-faced pulleys."

While the rope or cord is being applied to the pulley, glue is applied so as to secure the rope to the face of the pulley and to secure the various coils together.

I claim as my invention.

1. A pulley having a rim and a plurality of openings through one of the margins of the rim, said openings being located at intervals entirely around the rim, and a covering for the rim comprising a strand wrapped about said rim in a number of coils that are located side by side, one end portion of the said strand being threaded back and forth through the openings and presenting a series of stops above the rim of the pulley throughout its extent against which the adjacent coil may bear and is held against slipping from the rim.

2. A pulley having a rim, and sets of openings through both margins of the rim, said openings being located at intervals entirely around the rim, and a covering for the rim, comprising a strand wrapped about the said rim in a number of coils that are located side by side, the end portions of said strand that are located at the opposite margins of the rim being threaded back and forth through the openings and presenting at both margins a series of stops above the rim throughout its extent against which the adjacent coils may bear and are held against slipping from the edges of the rim.

In testimony whereof I have hereunto set my hand in presence of two subscribing witnesses.

WILLIE C. BEAM.

Witnesses:
A. O. BEHEL,
E. D. E. N. BEHEL.

Copies of this patent may be obtained for five cents each, by addressing the "Commissioner of Patents, Washington, D. C."